R. H. GARDNER.
CORN PLANTER.
APPLICATION FILED OCT. 27, 1910.

992,712.

Patented May 16, 1911.
2 SHEETS—SHEET 1.

Richard H. Gardner,
Inventor

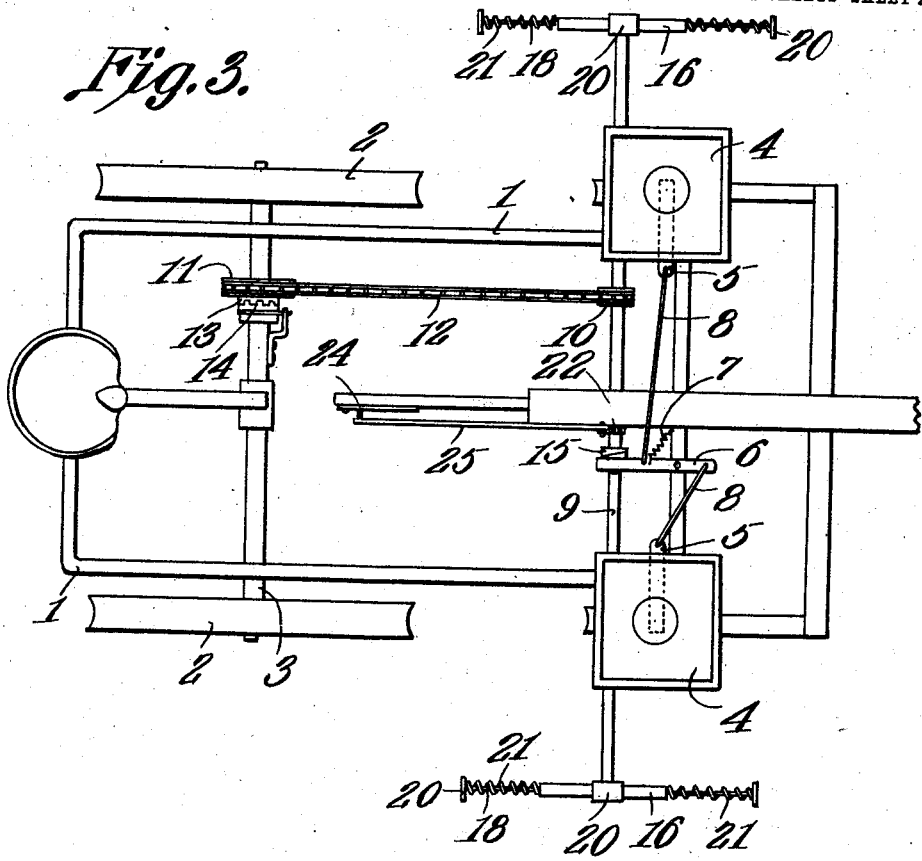
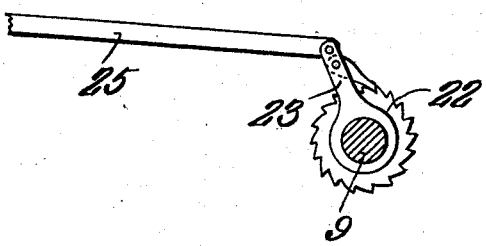

UNITED STATES PATENT OFFICE.

RICHARD H. GARDNER, OF FORT MADISON, IOWA, ASSIGNOR OF ONE-HALF TO HARRY FOGARTY, OF FORT MADISON, IOWA.

CORN-PLANTER.

992,712. Specification of Letters Patent. Patented May 16, 1911.

Application filed October 27, 1910. Serial No. 589,365.

*To all whom it may concern:*

Be it known that I, RICHARD H. GARDNER, a citizen of the United States, residing at Fort Madison, in the county of Lee and State of Iowa, have invented a new and useful Corn-Planter, of which the following is a specification.

This invention has relation to corn planters and consists in the novel construction and arrangement of its parts as hereinafter shown and described.

The object of the invention is to provide a check row device for a corn planter which may be operated without the use of the usual wire and which when employed will accurately mark off a field to indicate the location of the hills of corn planted by the planter.

With this object in view the planter includes a shaft which is operatively connected with the traction wheels of the planter and which in turn is operatively connected with the separating and dropping mechanism of the planter. Radially disposed resiliently supported arms are located at the end portions of the said shaft and are provided at their outer ends with plates which are adapted to be brought into contact with the surface of the soil and make impressions therein for the purpose of fixing the location of the hills of corn.

Figure 1:
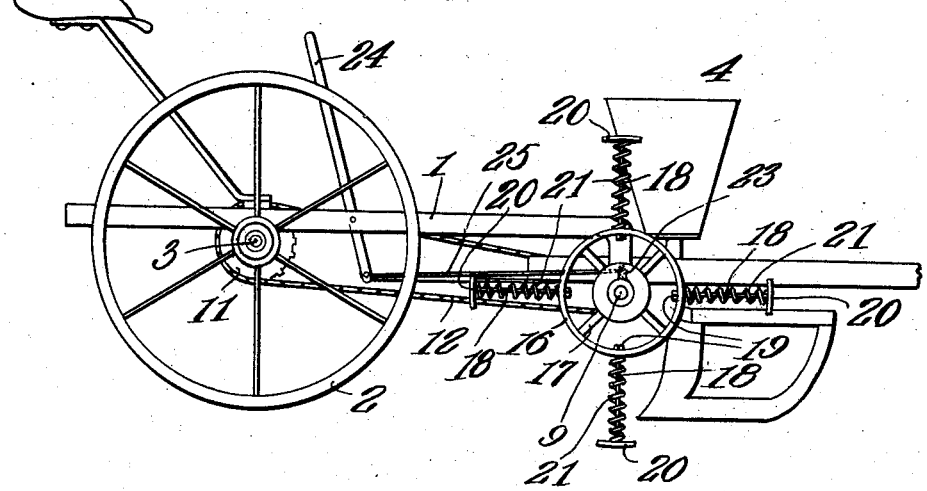
Figure 2:
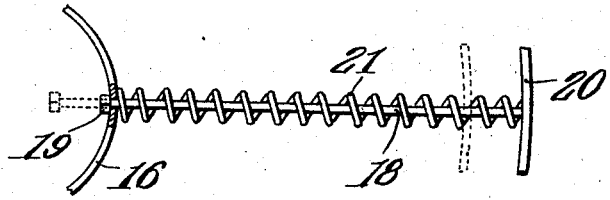

In the accompanying drawings:—Figure 1 is a side elevation of a corn planter. Fig. 2 is a detailed enlarged elevation of one of the arms used upon the planter. Fig. 3 is a top plan view of the planter. Fig. 4 is a detailed view of a portion of an advancing mechanism used upon the planter.

The planter consists of a frame 1 which is mounted upon traction wheels 2 and an axle 3 in the usual manner. Boxes 4 are mounted upon the frame 1 and are provided with seed separating and dropping plates or devices 5 of usual pattern. A lever 6 is fulcrumed upon the frame 1 and is held in a normal position by means of a spring 7 one end of which is attached to the said lever and the other end attached to the frame 1. Rods 8 are connected at their outer ends to the separating and dropping devices 5 and at their inner ends are pivotally connected to the lever 6 at opposite sides of the fulcrum thereof. A shaft 9 is journaled upon the frame 1 and extends transversely thereof with its end portion projecting to some extent beyond the side of the said frame. A sprocket wheel 10 is fixed to the shaft 9 and a sprocket wheel 11 is loosely journaled upon the axle 3. A sprocket chain 12 passes around sprocket wheels 10 and 11 and is adapted to transmit rotary movement from the axle 3 when the wheel 11 is fixed with relation to said axle through the shaft 9. The sprocket wheel 11 is provided with a clutch hub 13 and a clutch member 14 is mounted upon the axle 3 and is adapted to be engaged with the clutch hub 13 of the wheel 11 whereby the said wheel may be fixed with relation to the said axle 3 and caused to rotate in unison with the same. A cam disk 15 is fixed to the shaft 9 and the free end of the lever 6 lies in the path of movement of the said disk 15 whereby the said lever is swung upon its fulcrum as the disk rotates. By this arrangement the movement is transmitted from the shaft 9 through the lever 6 and rods 8 to the seed separating and dropping devices 5 located in the seed boxes 4.

Annular bands 16 are supported upon spokes 17 located at the ends of the shaft 9 and the inner end portions of radially disposed arms 18 are slidably located in the said bands 16. Nuts 19 are screw-threaded upon the inner ends of the arms 18 and are adapted to bear against the inner peripheral surface of the bands 16 and limit the outward movement of the arms 18 in the said bands. Plates 20 are carried at the outer ends of the arms 18 and coil springs 21 surround the said arms and bear at their outer ends against the plate 20 and at their inner ends against the outer peripheries of the bands 16. The springs 21 are under tension with a tendency to hold the plates 20 away from the bands 16 and the nuts 19 in contact with the inner peripheries of the said bands. A ratchet disk 22 is fixed to the shaft 9 and a pawl arm 23 is journaled upon the said shaft and carries a pawl adapted to engage the ratchets of the disk 22. A lever 24 is fulcrumed upon the frame 1 and is operatively connected with the pawl arm 23 by means of a rod 25 one end of which it attached to the said pawl arm and the other end connected to the said lever.

At any time when the clutch 14 is disengaged from the clutch hub 13 of the wheel 11 an operator may swing the lever 24 whereby the pawl carried by the pawl arm 23 will engage the teeth of the ratchet disk 22 and turn the said disk together with the shaft 9 and its attachments. Thus the arms 18 are swung about the axis of the shaft 9 so that a desired arm may be properly positioned with relation to the surface of the ground and the seed separating and dropping devices 5 are correspondingly positioned in order to effect the seed separation and dropping at proper intervals with relation to said arm 18. Thus it will be seen that means are provided for advancing or retarding the action of the seed separating and dropping devices and the marking device. As the planter moves across a field and the clutch member 14 is moved into engagement with the clutch hub 13 of the wheel 11 rotary movement is transmitted from the axle 3 to the shaft 9 as above stated and the arms 18 are swung about the axis of the shaft 9 and the plates 20 are successively brought in contact with the surface of the soil and depressed therein under the action of the coiled springs 21. Therefore the said plates make prints in the surface of the soil which indicate the localities at which the seed is dropped and planted. Should the plates 20 encounter obstructions at the surface of the soil the rods 18 may move longitudinally through the bands 16 against the tension of the springs 21 and thus the said plates together with the arms may move over the said obstructions without having a tendency to lift the forward portion of the planter or being broken by coming in contact with such obstructions.

Having thus described the invention what I claim as new and desire to secure by Letters Patent is:—

In combination with a planter having seed boxes provided with seed separating and dropping devices, a shaft journaled upon the frame of the planter and operatively connected with the supporting wheels thereof, means operatively connecting the shaft with the seed separating and dropping devices, spokes mounted upon the ends of the shafts, annular bands mounted at the ends of the spokes, rods slidably mounted in said bands between the spokes, nuts screw-threaded upon the inner ends of the rods, plates located at the outer ends of said rods and coiled springs surrounding the intermediate portions of the rods and bearing at their outer ends against the plates, and at their inner ends against the peripheries of the bands.

In testimony that I claim the foregoing as my own, I have hereto affixed my signature in the presence of two witnesses.

RICHARD H. GARDNER.

Witnesses:
 HARRY FOGARTY,
 J. M. CASEY.

---

Copies of this patent may be obtained for five cents each, by addressing the "Commissioner of Patents, Washington, D. C."